United States Patent
Gupta et al.

(10) Patent No.: US 9,311,155 B2
(45) Date of Patent: Apr. 12, 2016

(54) SYSTEM AND METHOD FOR AUTO-TAB COMPLETION OF CONTEXT SENSITIVE REMOTE MANAGED OBJECTS IN A TRAFFIC DIRECTOR ENVIRONMENT

(71) Applicant: ORACLE INTERNATIONAL CORPORATION, Redwood Shores, CA (US)

(72) Inventors: Amit Gupta, Bangalore (IN); Praveen Chandrasekharan, Bangalore (IN); Nagakishore Sidde, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 251 days.

(21) Appl. No.: 13/627,579

(22) Filed: Sep. 26, 2012

(65) Prior Publication Data

US 2013/0080514 A1    Mar. 28, 2013

Related U.S. Application Data

(60) Provisional application No. 61/539,886, filed on Sep. 27, 2011, provisional application No. 61/539,900, filed on Sep. 27, 2011.

(51) Int. Cl.
G06F 15/16 (2006.01)
G06F 9/44 (2006.01)
(Continued)

(52) U.S. Cl.
CPC .............. *G06F 9/505* (2013.01); *G06F 9/4443* (2013.01); *G06F 9/45512* (2013.01);
(Continued)

(58) Field of Classification Search
CPC ... G06F 9/505; G06F 9/4443; G06F 9/45512; G06F 17/276; G06F 11/2041; H04L 41/08; H04L 63/0853; H04L 67/1008
See application file for complete search history.

(56) References Cited

U.S. PATENT DOCUMENTS 6,560,717 B1   5/2003 Scott
6,691,244 B1   2/2004 Kampe et al.
(Continued)

FOREIGN PATENT DOCUMENTS

CN   1251669 A   4/2000
CN   1285055 C   11/2006
(Continued)

OTHER PUBLICATIONS

International Searching Authority, International Search Report and Written Opinion for PCT International Application No. PCT/US2012/057373, Feb. 14, 2013, 13 pages.
(Continued)

*Primary Examiner* — Wen-Tai Lin
(74) *Attorney, Agent, or Firm* — Tucker Ellis LLP (57) ABSTRACT

Described herein are systems and methods for providing software administration tools, for use in administering server configurations, such as in a traffic director or other type of server environment. In accordance with an embodiment, the system comprises a command-line interface and/or command-line shell which provides an autocompletion feature for remote objects including wherein, in response to an instruction from an administrator to invoke the feature, the system determines configurable remote back-end objects based on the context of the command-line at the time of invocation, and uses the information to one of autocomplete the command-line input or provide a list of remote back-end objects.

12 Claims, 4 Drawing Sheets

(51) Int. Cl.
| | |
|---|---|
| *G06F 9/50* | (2006.01) |
| *G06F 17/27* | (2006.01) |
| *G06F 9/455* | (2006.01) |
| *G06F 11/20* | (2006.01) |
| *H04L 29/08* | (2006.01) |
| *H04L 12/24* | (2006.01) |
| *H04L 29/06* | (2006.01) |

(52) U.S. Cl.
CPC ......... *G06F 11/2041* (2013.01); *G06F 17/276* (2013.01); *H04L 41/08* (2013.01); *H04L 63/0853* (2013.01); *H04L 67/1008* (2013.01)

(56) References Cited

U.S. PATENT DOCUMENTS

| | | |
|---|---|---|
| 6,701,438 B1 | 3/2004 | Prabandham |
| 6,880,156 B1 | 4/2005 | Landherr |
| 7,099,915 B1 | 8/2006 | Tenereillo |
| 7,158,926 B2 | 1/2007 | Kampe |
| 7,289,445 B2 | 10/2007 | Illikkal |
| 7,321,926 B1 | 1/2008 | Zhang |
| 7,370,083 B2 | 5/2008 | Husain et al. |
| 7,395,355 B2 | 7/2008 | Afergan |
| 7,616,625 B1 | 11/2009 | Un |
| 7,619,545 B2 | 11/2009 | Samuels |
| 7,664,948 B2 | 2/2010 | Moreau |
| 7,849,368 B2 | 12/2010 | Srivastava |
| 8,059,653 B1 | 11/2011 | Wang |
| 8,230,336 B2 * | 7/2012 | Morrill ............... G06F 17/2235 715/205 |
| 8,260,757 B1 | 9/2012 | Chatterjee |
| 8,693,981 B1 | 4/2014 | Anugu |
| 2001/0049732 A1 | 12/2001 | Raciborski |
| 2001/0049741 A1 | 12/2001 | Skene |
| 2002/0055980 A1 | 5/2002 | Goddard |
| 2002/0055982 A1 | 5/2002 | Goddard |
| 2002/0087694 A1 | 7/2002 | Daoud |
| 2002/0122388 A1 | 9/2002 | Behbehani |
| 2002/0143953 A1 | 10/2002 | Aiken |
| 2002/0143965 A1 | 10/2002 | Aiken |
| 2002/0152307 A1 | 10/2002 | Doyle et al. |
| 2003/0023743 A1 | 1/2003 | Raphel |
| 2003/0051055 A1 | 3/2003 | Parrella et al. |
| 2003/0188013 A1 | 10/2003 | Nishikado |
| 2003/0195940 A1 | 10/2003 | Basu |
| 2004/0024853 A1 | 2/2004 | Cates |
| 2004/0024861 A1 | 2/2004 | Coughlin |
| 2004/0031030 A1 | 2/2004 | Kidder |
| 2004/0049598 A1 | 3/2004 | Tucker |
| 2004/0107273 A1 | 6/2004 | Biran |
| 2004/0172470 A1 | 9/2004 | Shiina |
| 2005/0086337 A1 | 4/2005 | Quittek |
| 2005/0102400 A1 | 5/2005 | Nakahara |
| 2005/0188295 A1 | 8/2005 | Konkus et al. |
| 2005/0198247 A1 | 9/2005 | Perry |
| 2005/0213507 A1 | 9/2005 | Banerjee |
| 2005/0262183 A1 | 11/2005 | Colrain et al. |
| 2006/0062177 A1 | 3/2006 | Asthana |
| 2006/0085680 A1 | 4/2006 | Matsuno |
| 2006/0190579 A1 | 8/2006 | Rachniowski et al. |
| 2006/0294207 A1 | 12/2006 | Barsness |
| 2007/0005801 A1 | 1/2007 | Kumar et al. |
| 2007/0130341 A1 | 6/2007 | Ma |
| 2007/0169049 A1 | 7/2007 | Gingell et al. |
| 2007/0174660 A1 | 7/2007 | Peddada |
| 2007/0226359 A1 | 9/2007 | Gunduc et al. |
| 2007/0260702 A1 | 11/2007 | Richardson |
| 2008/0046596 A1 | 2/2008 | Afergan |
| 2008/0133536 A1 | 6/2008 | Bjorner et al. |
| 2008/0228939 A1 | 9/2008 | Samuels |
| 2009/0006541 A1 | 1/2009 | Baba |
| 2009/0077233 A1 | 3/2009 | Kurebayashi |
| 2009/0204885 A1 | 8/2009 | Ellsworth et al. |
| 2009/0245122 A1 | 10/2009 | Maiocco |
| 2009/0259736 A1 | 10/2009 | Chang |
| 2009/0328054 A1 | 12/2009 | Paramasivam et al. |
| 2010/0030851 A1 | 2/2010 | Inden |
| 2010/0036956 A1 | 2/2010 | Nishikawa |
| 2010/0070561 A1 | 3/2010 | Dhoolia et al. |
| 2010/0220740 A1 | 9/2010 | Hufferd |
| 2010/0235484 A1 | 9/2010 | Bolan et al. |
| 2011/0106949 A1 | 5/2011 | Patel |
| 2011/0107136 A1 | 5/2011 | Jonnagadla et al. |
| 2011/0122893 A1 | 5/2011 | Kang |
| 2011/0145786 A1 * | 6/2011 | Fayed et al. ................... 717/115 |
| 2011/0161523 A1 | 6/2011 | Erickson |
| 2011/0208808 A1 | 8/2011 | Corbett |
| 2011/0276695 A1 | 11/2011 | Maldaner |
| 2012/0096166 A1 | 4/2012 | Devarapalli |
| 2012/0271964 A1 | 10/2012 | Porter |
| 2013/0054806 A1 | 2/2013 | Francis |
| 2014/0089285 A1 * | 3/2014 | Gibbs ........................... 707/706 |

FOREIGN PATENT DOCUMENTS

| | | |
|---|---|---|
| CN | 101346972 A | 1/2009 |
| EP | 1134658 | 9/2001 |
| GB | 2 360 369 A | 9/2001 |
| WO | 02/07037 | 1/2002 |
| WO | 03/105004 | 12/2003 |
| WO | 2004/008334 | 1/2004 |

OTHER PUBLICATIONS

International Searching Authority, International Search Report and Written Opinion for PCT International Application No. PCT/US2012/057370, May 31, 2013, 17 pages.

International Searching Authority, International Search Report and Written Opinion for PCT International Application No. PCT/US2012/057375, May 24, 2013, 19 pages.

International Searching Authority, International Search Report and Written Opinion for PCT International Application No. PCT/US2012/057620, Jun. 5, 2013, 22 pages.

Wikipedia, HTTP Compression, pp. 1-2, http://en.wikipedia.org/w/index.php?title=HTTP_compression&oldid=450858133, Sep. 16, 2011.

Method and System for Displaying Graphical Objects in a Command Line Interface (CLI) Terminal, ip.com Journal, ip.com Inc., West Henrietta, NY, US, Feb. 18, 2010.

Elkstein, Dr. M., 14.3 How Do I Handle Authentication in REST?, Aug. 26, 2011, http://web.archive.org/web/20110826023142/http://rest.elkstein.org/2008/01/how-do-i-handle-authentication-in-rest.html, retrieved Apr. 24, 2013.

Unknown Author, ServerIron ADX Health Checks, Chapter 4, Health Checks Overview, Jun. 2009, 76 pages.

Gouthaman, et al., Oracle Traffic Director, Administrator's Guide, 11g Release 1 (11.1.1.7.0), Aug. 2013, 312 pages.

State Intellectual Property Office of the People's Republic of China, Search Report for Chinese Patent Application No. 201280047085.8, from Office Action dated Aug. 20, 2015, 2 pages.

* cited by examiner

SYSTEM AND METHOD FOR AUTO-TAB COMPLETION OF CONTEXT SENSITIVE REMOTE MANAGED OBJECTS IN A TRAFFIC DIRECTOR ENVIRONMENT

CLAIM OF PRIORITY

This application claims the benefit of priority to U.S. Provisional Patent Application No. 61/539,886, titled "SYSTEMS AND METHODS FOR USE WITH AN APPLICATION SERVER TRAFFIC DIRECTOR (CORE FEATURES)", filed Sep. 27, 2011; and U.S. Provisional Patent Application No. 61/539,900, titled "SYSTEMS AND METHODS FOR USE WITH AN APPLICATION SERVER TRAFFIC DIRECTOR (ADMIN FEATURES)", filed Sep. 27, 2011; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to software administration tools, for use in administering server configurations, and is particularly related to a system and method for auto-tab completion of context sensitive remote managed objects in a traffic director or other type of server environment.

BACKGROUND

A typical enterprise-level computing environment can include many different types of computing resources (e.g., web servers, application servers, database servers, or other types of resource servers) which are intended to be accessed over a network (e.g., a company's internal Ethernet network, or the Internet) by other computers, or by users operating various different types of computing devices. A familiar example is the use of a client computer, such as a laptop equipped with a web browser application, by which a user can access a web server via the Internet.

Today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies. These are the types of environments that embodiments of the invention can be used with.

SUMMARY

Described herein are systems and methods for providing software administration tools, for use in administering server configurations, such as in a traffic director or other type of server environment. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

In accordance with an embodiment, the system comprises a command-line interface and/or command-line shell which provides an autocompletion feature for remote objects including wherein, in response to an instruction from an administrator to invoke the feature, the system determines configurable remote back-end objects based on the context of the command-line at the time of invocation, and uses the information to one of autocomplete the command-line input or provide a list of remote back-end objects. Embodiments of the invention can also be used with other types of server environment.

DETAILED DESCRIPTION

As described above, today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies. It is also desirable to be able to manage or administer such systems efficiently and securely.

Described herein are systems and methods for providing software administration tools for use in administering server configurations, and in particular a system and method for auto-tab completion of context sensitive remote managed objects. In accordance with an embodiment, the systems and methods can be used with a server environment such as a traffic director, referred to herein in some embodiments as "Oracle Traffic Director" (OTD), which is provided as a software-based load balancer that can be used to deliver Internet and other traffic to back-end origin servers, such as web servers, application servers, or other resource servers.

In accordance with an embodiment, the traffic director serves as an entry point for traffic such as hypertext transfer protocol (HTTP) and hypertext transfer protocol secure (HTTPS) requests, which are received from clients or client devices, for communication to a back-end of resources or resource servers acting as origin servers. Each traffic director includes one or more traffic director instances defined by a configuration, wherein the configuration provides information about various elements of that instance, such as listeners, origin servers, failover groups, and logs.

Examples of the types of clients that can be used with the system include computer servers, laptop computers, portable devices such as smartphones, and other types of computing devices, some of which may include, e.g., a web browser application for accessing a web server.

Examples of the types of resources that can be used as origin servers include lightweight directory access protocol (LDAP) servers, web servers, multimedia servers, application servers, database servers, and other types of resources.

From an administration perspective, in accordance with an embodiment, the traffic director is designed to be easy to install, configure, and use; and can include a simple, wizard-driven graphical interface, as well as a robust command-line interface, for use by an administrator in managing traffic director instances. For any particular organization, depending on their business requirements, such as the number of back-end applications for which they want to use the traffic director to balance requests, their internal requirements such as security, and the traffic director features they wish to use, the traffic director topology can be varied to address their needs.

GLOSSARY

In accordance with an embodiment, the following terms are used herein. It will be evident that, in accordance with other embodiments, additional and/or different terms can be used.

Configuration: A collection of configurable elements (e.g., metadata) that determines the run-time behavior of a traffic director instance. In accordance with an embodiment, a typical configuration contains definitions for listeners (e.g., IP address and port combinations) on which the traffic director should listen for requests, together with information about servers at the back-end to which the requests should be sent. The traffic director can read the configuration when a traffic director instance starts, and while processing client requests.

Instance (Traffic Director Instance): A traffic director server that is instantiated from a configuration and deployed on an administration node or the administration server.

Cluster: A collection of two or more traffic director instances that are created from the same configuration.

Failover Group: Two or more traffic director instances grouped by a virtual IP address (VIP).

Administration Server: A specially configured traffic director instance that hosts the interfaces, including administration console and command-line interface, through which an administrator can create traffic director configurations, deploy them as instances on administration nodes, and manage the instances.

Administration Node: A physical server that is designated as a host on which the administrator can deploy traffic director instances. In accordance with an embodiment, on a given node, the administrator can deploy only one instance of a configuration.

INSTANCE_HOME: A directory of the administrator's choice, on the administration server or an administration node, in which the configuration data and binary files pertaining to traffic director instances are stored.

ORACLE_HOME: A directory of the administrator's choice in which the administrator installs the traffic director binaries.

Administration Console: A web-based graphical interface on the administration server that the administrator can use to create, deploy, and manage traffic director instances.

Client: In accordance with an embodiment, an agent (e.g., a web browser or an application) that sends requests (e.g., HTTP and HTTPS requests) to traffic director instances. Examples of the types of clients that can be used with the system include computer servers, laptop computers, portable devices such as smartphones, and other types of computing devices, some of which may include, e.g., a web browser application for accessing a web server.

Origin Server: In accordance with an embodiment, a resource or server at the back-end, to which the traffic director forwards the requests that it receives from clients, and from which it receives responses to client requests. Examples of the types of resources that can be used as origin servers include lightweight directory access protocol (LDAP) servers, web servers, multimedia servers, application servers, database servers, and other types of resources.

Origin-server Pool: A collection of origin servers that host the same application or service, and that the administrator can load-balance by using the traffic director. In accordance with an embodiment, the traffic director distributes client requests to servers in the origin-server pool based on the load-distribution method(s) that are specified for that pool.

Virtual Server: A virtual entity within a traffic director server instance that provides a unique IP address (or host name) and port combination, through which the traffic director can serve requests for one or more domains. In accordance with an embodiment, a traffic director instance on a node can contain multiple virtual servers. The administrator can configure settings such as the maximum number of incoming connections specifically for each virtual server, and can also customize how each virtual server handles requests.

Figure 1:
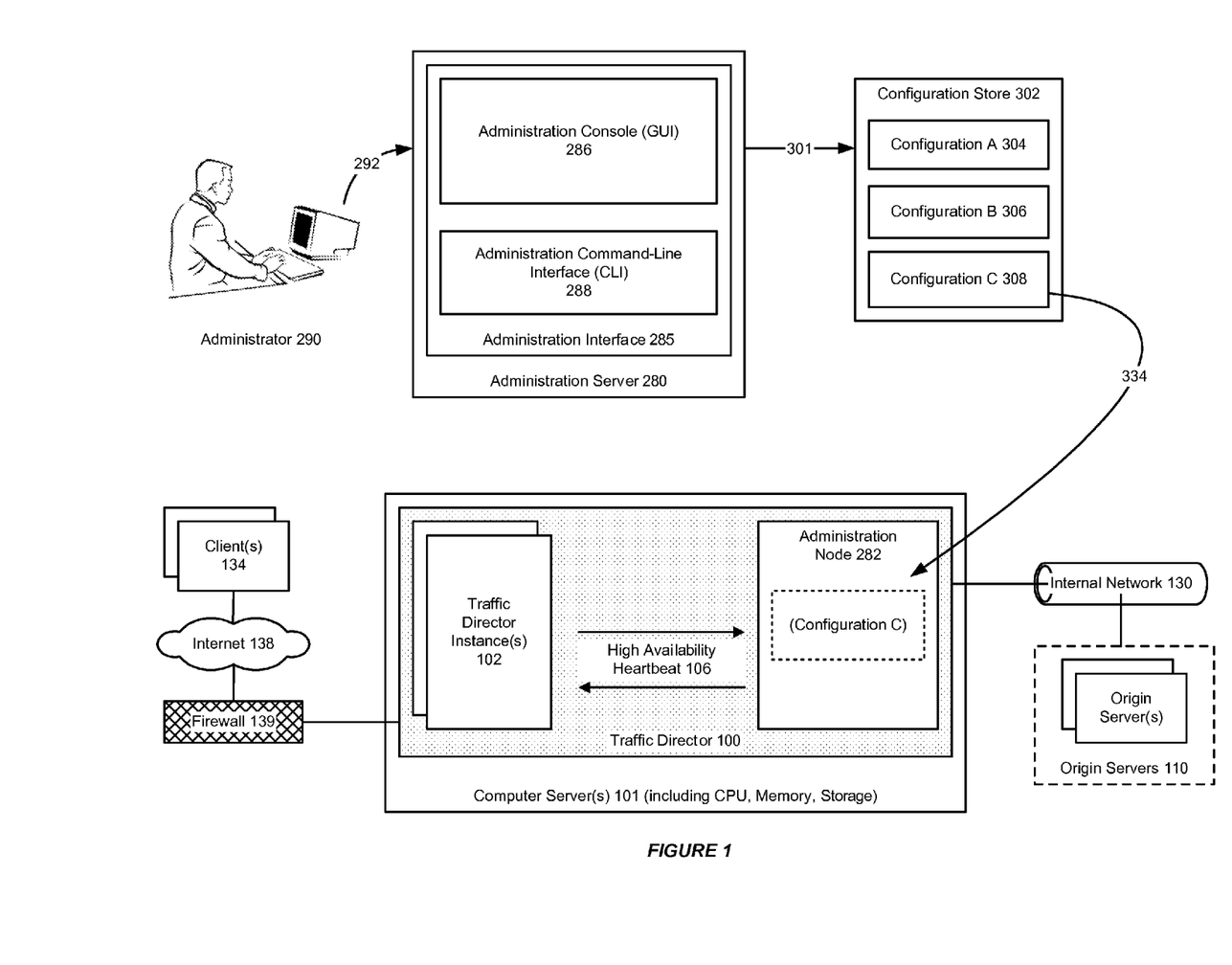
FIG. 1 illustrates a computing environment which includes a server environment, such as a load balancer or traffic director, which can be managed using auto-tab completion of context sensitive remote managed objects, in accordance with an embodiment.

FIG. 1 illustrates a computing environment which includes a server environment, such as a load balancer or traffic director, which can be managed using auto-tab completion of context sensitive remote managed objects, in accordance with an embodiment. As shown in FIG. 1, in accordance with an embodiment, a server environment (e.g., a traffic director 100) can be deployed on one or more physical computer servers 101 or similar computing devices that include a processor (CPU), memory, and storage, and can include one or more server instances (e.g., traffic director instances 102), which in turn can communicate with one another using a high-availability heartbeat or similar means 106.

In accordance with an embodiment, the back-end can include one or more origin servers 110. Each of the origin servers can communicate with one another, and with the traffic director, via an internal network 130 such as an Ethernet network. The traffic director can receive requests from clients 134, via the Internet 138, and in the case of many organizations a firewall 139.

In accordance with an embodiment, from an administration perspective, the server environment is designed to be easy to install, configure, and use; and can include a simple, wizard-driven graphical interface, as well as a robust command-line interface, for use by an administrator in managing server instances. At least one of the server instances can be designated an administration node 282. An administration server 280 includes an administration interface 285, which in turn includes one or more of an administration console (GUI) 286 and/or a command line interface 288, that enables an administrator 290 to configure or otherwise administer 292 the server environment or its server instances.

In accordance with an embodiment, a configuration is a collection of configurable elements that determines the run-time behavior of a server instance. A typical configuration may contain, e.g., definitions for listeners on which the traffic director should listen for requests, together with information about servers at the back-end to which the requests should be sent. The server environment, e.g., traffic director, can read the configuration when a server instance starts, and while processing client requests. An administrator can define 301 configurations 304, 306, 308 for server instances, which are stored in a configuration store 302 on the administration server. The administrator can then instantiate a configuration by deploying it 334 on one or more administration nodes.

It will be evident that the example shown in FIG. 1 is provided for purposes of illustration and that, in accordance with other embodiments, different types of server environment, and different deployment scenarios can be used.

Command Line Interface with Auto-Tab Completion

In accordance with an embodiment, the system includes a command-line interface (CLI) and/or command-line shell, which provides the administrator with an intuitive auto-completion feature for configurable remote objects within a server environment such as a traffic director.

For example, in accordance with an embodiment (referred to herein in some instances as auto-tab completion), pressing the Tab key instructs the system to autocomplete a command-line input, or alternatively to provide a list of configurable remote back-end objects within the command-line shell, based on the context of the command-line when the feature is invoked.

Figure 2:
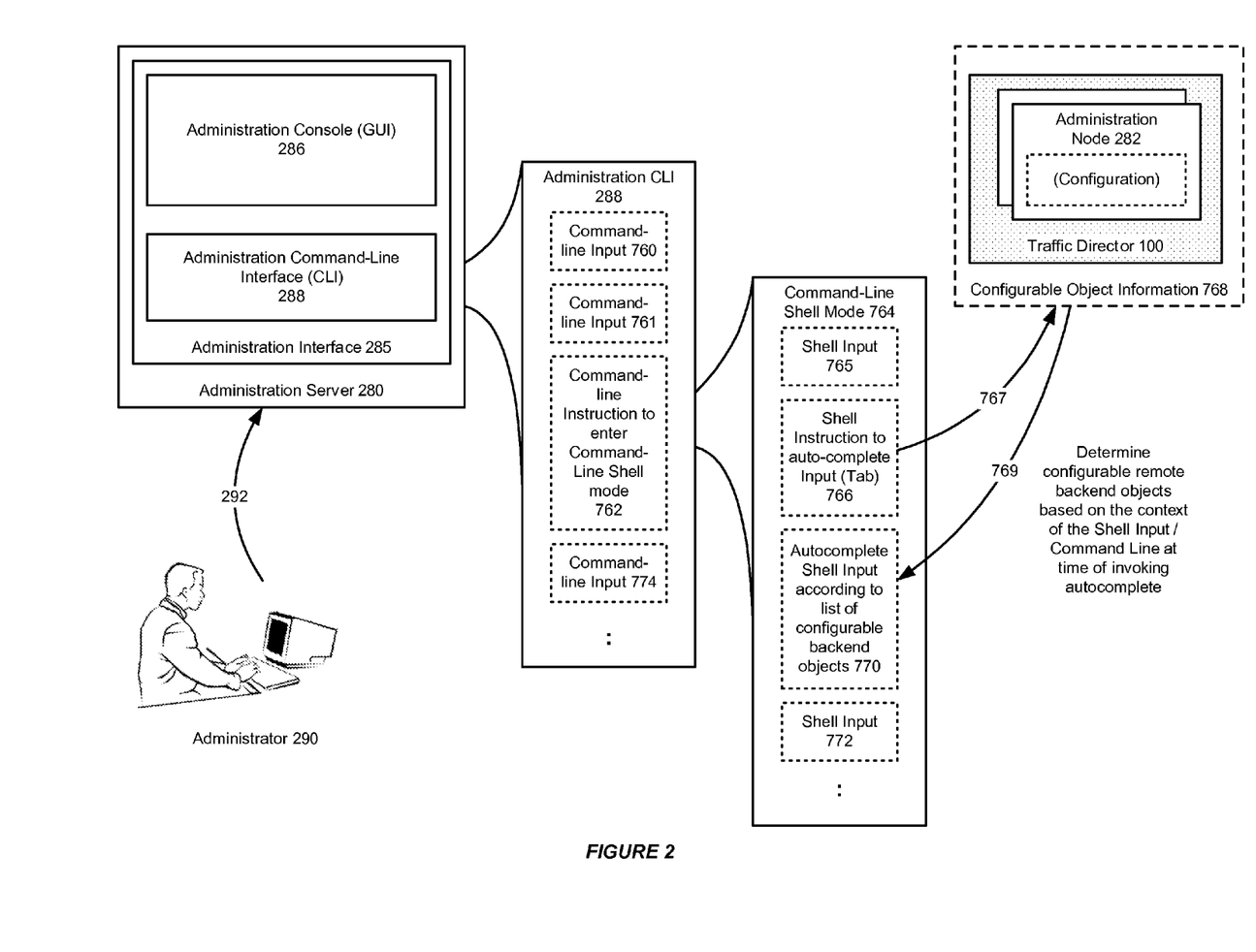
FIG. 2 illustrates a command-line interface, in accordance with an embodiment.

FIG. 2 illustrates a command-line interface, in accordance with an embodiment. As shown in FIG. 2, the administration command-line interface 288 includes a standalone mode that allows an administrator to access and configure the server environment (e.g. the traffic director environment). During the course of administering the environment, the administrator can enter one or more command-line inputs 760, 761 (examples of which are described in further below), which are then passed to the administration server and/or an administration node.

As further shown in FIG. 2, at any point, the administrator can also request 762 that the command-line interface enter a command-line shell mode 764.

In accordance with an embodiment, the shell mode provides an autocompletion feature for remote objects. For example, at any point while using the shell mode to enter input 765, the administrator can request 766 autocompletion of a command, e.g., by pressing the Tab key. In accordance with other embodiments, other means of issuing such a request, such as other key combinations can be used to invoke the autocompletion feature.

In response, in accordance with an embodiment, the system determines configurable remote back-end objects based on the context of the command-line or partial command at the time of invoking the autocomplete 767, and uses this information to one of autocomplete the command-line input, or provide a list of remote configurable back-end objects for the administrator to select for review and/or modification 769.

In accordance with an embodiment, the configurable remote back-end object can be retrieved from the server environment or server instances, or from another source of configuration information, such as the configuration store.

Figure 3:
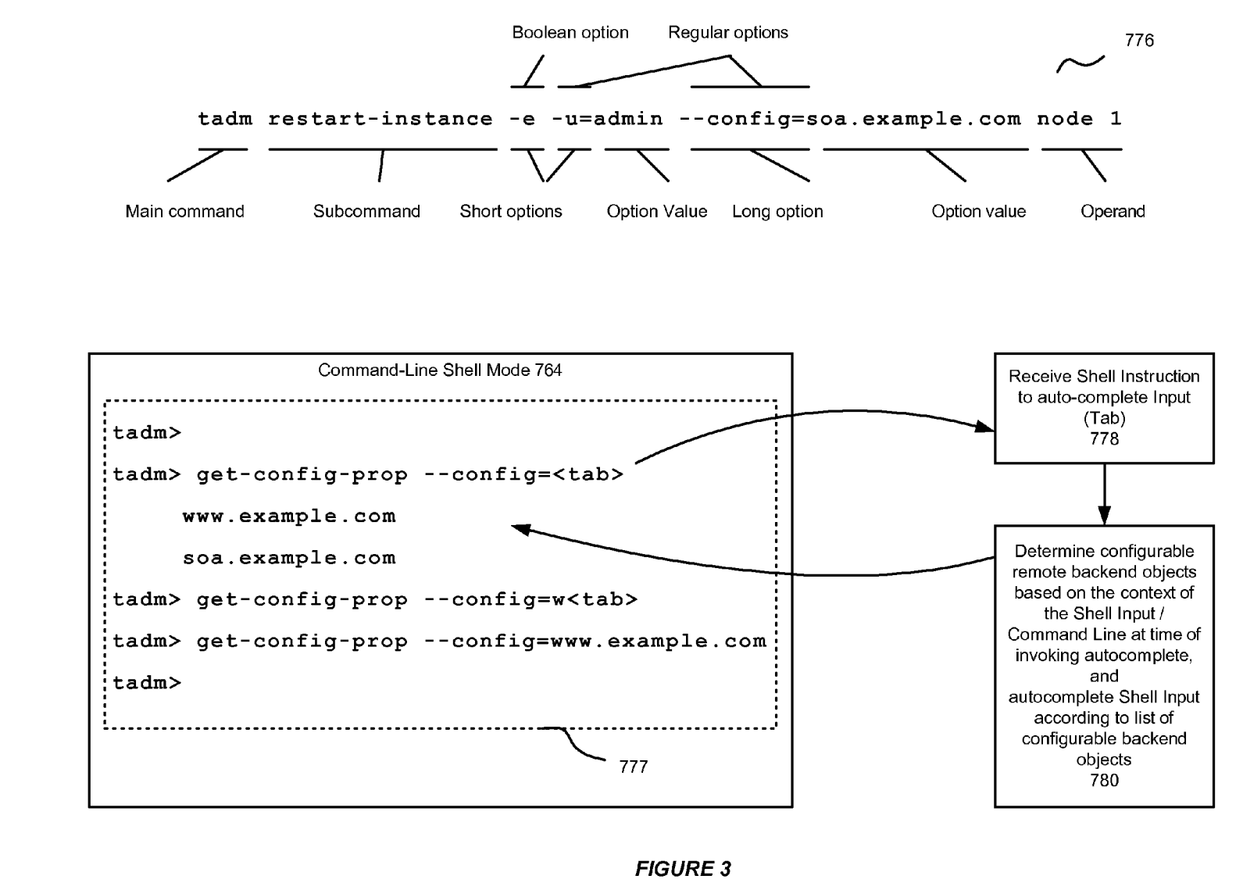
FIG. 3 illustrates use of a command-line interface, in accordance with an embodiment.

FIG. 3 illustrates use of a command-line interface, in accordance with an embodiment. As shown in FIG. 3, in accordance with an embodiment, the general syntax of each command-line input 776 includes a command name, options, and an operand. Generally, command-line options begin with either a (--) or a (-) notation, for example, in a command-line standalone mode:

```
$
$ tadm --user=admin --port=1895
$ tadm -u admin -p 1895
$
```

In accordance with an embodiment, in the command-line standalone mode, the administrator can invoke the command line interface (tadm) by specifying a command, options, and operands. Once the command is executed, the command line interface exits, for example:

```
$
$ tadm create-config --user=admin --password-file=./admin.pwd --http-port=2222 --server-name=syrinx myconfig
CLI201 Command 'create-config' ran successfully.
$
```

The administrator can also invoke the command line interface from a command prompt by not fully specifying a command, in which case the command-line interface prompts the administrator to enter the command. Once the command is executed, the control returns to the shell mode, which can then be exited by typing an exit or quit command, for example:

```
$
$ tadm --user=admin --password-file=./admin.pwd --host=localhost --port=8989
tadm> list-configs
    www.example.com
    soa.example.com
tadm> exit
$
```

In accordance with an embodiment, the autocompletion or auto-tab complete feature can be invoked within the shell mode, e.g., by pressing the Tab key, to autocomplete a command and/or its options. For tadm options, the administrator can type "--" and press the Tab key. The shell will then list the available options of a particular command.

For example, if the administrator types "--c" and presses the Tab key, then the shell will only complete the command line option if it is unique. The shell will determine the configurable remote back-end objects only when the Tab key is pressed on a value of the command line option, e.g., "--config=<Tab>", and either (a) attempt to complete the option if it is unique (i.e., there are no other options starting with that letter "c"); or (b) if there are a plurality of potential options, they will be listed, for example:

```
        tadm
        tadm p<tab>
        tadm pull-config
```

In the above example, invoking the autocompletion feature by entering "tadm p" and pressing the Tab key completes the tadm command "pull-config".

In accordance with an embodiment, the administrator can repeatedly invoke the autocompletion feature within the shell mode, for example as shown 777 in FIG. 3:

```
    tadm>
    tadm> get-config-prop --config=<tab>
        www.example.com
        soa.example.com
    tadm> get-config-prop --config=w<tab>
    tadm> get-config-prop --config=www.example.com
    tadm>
```

In the above example, when the administrator types "get-config-prop--config=" and presses the Tab key, the system receives the shell instruction to auto-complete 778, and determines configurable remote backend objects based on the context of the shell input/command line at the time of invoking autocomplete, and autocompletes the shell input according to the list of configurable backend objects 780, in this example by returning a list of two options "www.example.com" and "soa.example.com".

Similarly, when the administrator types "get-config-prop--config=w" and presses the Tab key, the system receives the shell instruction to auto-complete, determines configurable remote backend objects, and autocompletes the shell input according to the list of configurable backend objects, in this example by completing "get-config-prop--config=www.example.com".

Figure 4:
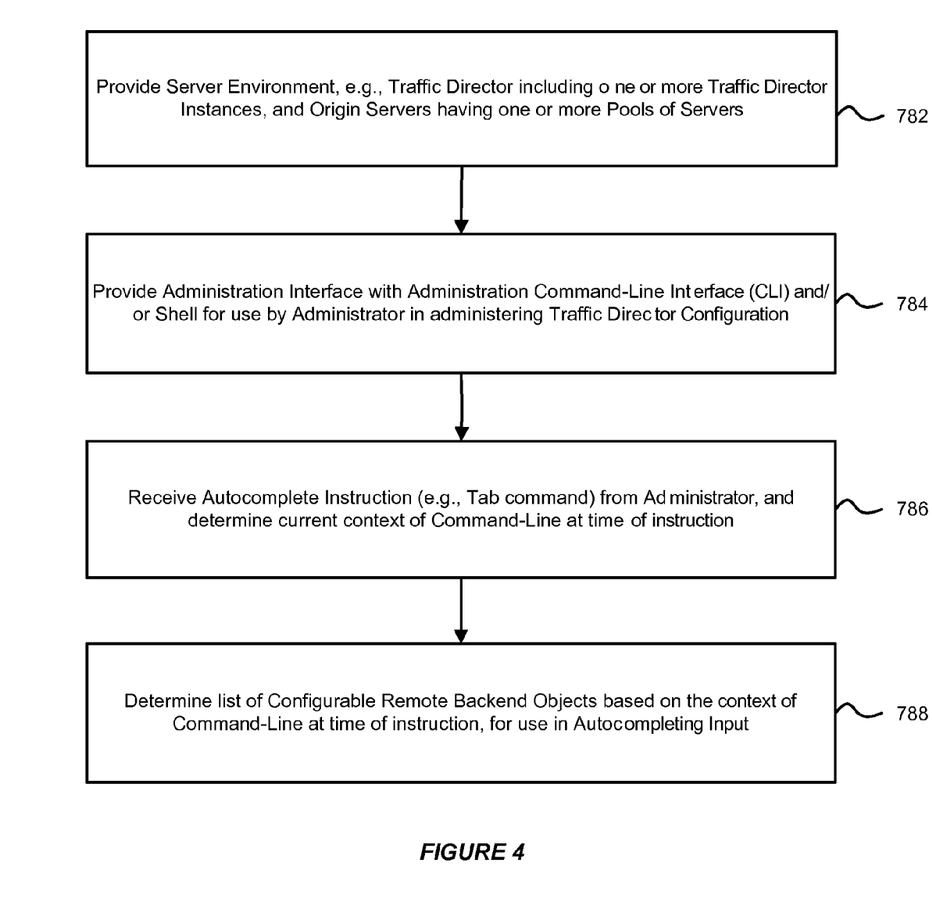
FIG. 4 is a flowchart of a method for using a command-line interface, in accordance with an embodiment.

FIG. 4 is a flowchart of a method for using a command-line interface, in accordance with an embodiment. As shown in FIG. 4, at step 782, a server environment such as a traffic director environment is provided, including a traffic director having one or more traffic director instances, and origin servers having one or more pools of servers.

At step 784, an administration interface with an administration command-line interface and/or shell is provided for use by the administrator in administering the traffic director configuration.

At step 786, the system receives an autocomplete instruction from the administrator (e.g., a Tab command), and determines the current context of command-line at the time of instruction.

At step 788, the system determines a list of configurable remote back-end objects based on the context of the command-line at time of instruction, and uses this information to one of autocomplete the command-line input or provide the list of back-end objects for the administrator to select for review and/or modification.

Although the embodiments described above illustrate the use of the autocompletion or auto-tab complete feature in accordance with a traffic director environment, in accordance with other embodiments similar functionality can be used with user interfaces for other server environments, to assist users in reviewing and configuring configurable objects for those environments.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Although some of the described embodiments describe features in the context of an Oracle Traffic Director environment, the described features can also be used in the context of other computing environments.

Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A server system for auto-tab completion of context sensitive remote managed objects in a server environment, comprising:
    one or more computers;
    a server environment operating on the one or more computers, the server environment having one or more traffic director instances,
    wherein each of the traffic director instances
        acts as a load balancer when processing client requests, and
        reads a configuration when the traffic director instance starts to determine run-time behavior of the traffic director instance,
        wherein the configuration defines a plurality of remote back-end objects; and
    an interface that allows input of a command-line, wherein the interface provides an autocompletion feature for remote objects from the plurality of remote back-end objects that are able to be configured by the user at the command-line;
    wherein, in response to an instruction from a user to invoke the autocompletion feature, the server system
        determines the remote back-end objects that are able to be configured by the user at the command-line based on a context of the command-line at the time of invocation,
        wherein the context of the command-line is determined based on entry and syntax of any command name, option, operand or portions thereof in the command-line at the time of invocation, and
        uses the determined remote back-end objects to one of autocomplete input of the command-line or provide a list of the determined remote back-end objects for input into the command-line to thereby enable configuration of the determined remote back-end objects by the user.

2. The system of claim 1, wherein the user can request that the interface enter a shell mode, wherein the shell mode similarly provides an autocompletion feature for remote objects.

3. The system of claim 1, wherein the autocompletion feature either attempts to complete input for the command-line if there are no other options matching the context of the command-line at the time of invocation, or if there are any options, listing those options.

4. The system of claim 1, wherein the context of the command-line at the time of invocation is an option or portion thereof specified by the user on the command-line.

5. A method for auto-tab completion of context sensitive remote managed objects in a server environment, comprising the following computer-implemented steps of:
    providing a server environment having one or more traffic director instances,
    wherein each of the traffic director instances
        acts as a load balancer when processing client requests, and reads a configuration when the traffic director instance starts to determine run-time behavior of the traffic director instance, wherein the configuration defines a plurality of remote back-end objects;

providing an interface that allows input of a command-line having an autocompletion feature for remote objects from the plurality of remote back-end objects that are able to be configured by the user at the command-line; and in response to an instruction from a user to invoke the autocompletion feature, determining the remote back-end objects that are able to be configured by the user at the command-line based on a context of the command-line at the time of invocation, wherein the context of the command-line is determined based on entry and syntax of any command name, option, operand or portions thereof in the command-line at the time of invocation, using the determined remote back-end objects to one of autocomplete input of the command-line or provide a list of the determined remote back-end objects for input into the command-line to thereby enable configuration of the determined remote back-end objects by the user.

6. The method of claim 5, wherein the user can request that the interface enter a shell mode, wherein the shell mode similarly provides an autocompletion feature for remote objects.

7. The method of claim 5, wherein the autocompletion feature either attempts to complete input of the command-line if there are no other options matching the context of command-line at the time of invocation, or if there are any options, listing those options.

8. The method of claim 5, wherein the context of the command-line at the time of invocation is an option or portion thereof specified by the user on the command-line.

9. A non-transitory computer readable storage medium, including instructions stored thereon which when read and executed by one or more computers cause the one or more computers to perform the following computer-implemented steps comprising:

providing a server environment having one or more traffic director instances, wherein each of the traffic director instances acts as a load balancer when processing client requests, and reads a configuration when the traffic director instance starts to determine run-time behavior of the traffic director instance, wherein the configuration defines a plurality of remote back-end objects; and providing an interface that allows input of a command-line, wherein the interface provides an autocompletion feature for remote objects from the plurality of remote back-end objects that are able to be configured by the user at the command-line; and in response to an instruction from a user to invoke the feature, determining the remote back-end objects that are able to be configured by the user at the command-line based on a context of the command-line at the time of invocation, wherein the context of the command-line is determined based on entry and syntax of any command name, option, operand or portions thereof in the command-line at the time of invocation, using the determined remote back-end objects to one of autocomplete input of the command-line or provide a list of the determined remote back-end objects for input into the command-line to thereby enable configuration of the determined remote back-end objects by the user.

10. The non-transitory computer readable storage medium of claim 9, wherein the user can request that the interface enter a shell mode, wherein the shell mode similarly provides an autocompletion feature for remote objects.

11. The non-transitory computer readable storage medium of claim 9, wherein the autocompletion feature either attempts to complete input of the command-line if there are no other options matching the context of the command-line at the time of invocation, or if there are any options, listing those options.

12. The non-transitory computer readable storage medium of claim 9, wherein the context of the command-line at the time of invocation is an option or portion thereof specified by the user on the command-line.

\* \* \* \* \*